United States Patent

[11] 3,621,359

[72] Inventor Kurt Schnegg
 Yverdon, Switzerland
[21] Appl. No. 21,947
[22] Filed Mar. 23, 1970
[45] Patented Nov. 16, 1971
[73] Assignee Leclanche S. A.
 Yverdon Canton of Vaud, Switzerland
[32] Priority Mar. 28, 1969
[33] Switzerland
[31] 4761/69

[54] METHOD OF DETECTING THE END-OF-CHARGE CONDITION OF AN ELECTRIC STORAGE BATTERY UNDER CHARGE AND DEVICE FOR THE CARRYING OUT OF THIS METHOD
12 Claims, 7 Drawing Figs.

[52] U.S. Cl. ................................................ 320/43,
 320/14, 320/48, 324/29.5, 340/249
[51] Int. Cl. ........................................................ H02j 7/00
[50] Field of Search .......................................... 320/14, 13,
 21, 31, 43, 32, 33, 44–45, 48, 51; 340/249;
 324/29.5

[56] References Cited
 UNITED STATES PATENTS
3,517,294 6/1970 Ruben ........................ 320/43
2,885,623 5/1959 Staufenberg, Jr. ............. 320/45
3,178,629 4/1965 Saslow .......................... 320/51 X
3,562,634 2/1971 Latner .......................... 324/29.5
1,382,622 6/1921 Bryce ............................ 320/14
3,098,188 7/1963 Dawkins ....................... 320/31
3,176,210 3/1965 Bethke ......................... 320/21 UX
3,500,167 3/1970 Applegate et al. ............. 320/14
3,517,293 6/1970 Burkett et al. ................. 320/14

Primary Examiner—J. D. Miller
Assistant Examiner—John M. Gunther
Attorney—Stevens, Davis, Miller & Mosher ABSTRACT: Method and means for detecting the end-of-charge condition of a storage battery under charge comprising periodically interrupting the charging current, maintaining the interruption for a period corresponding to the time constant of the internal resistance of chemical origin of the battery, measuring the voltage of the battery with a voltage test member, applying a resulting electrical magnitude developed by the test member to a threshold-comparator member which thereupon supplies a signal indicative of whether the electrical magnitude has reached a value determined in the comparator member by a threshold parameter on the basis of which the comparator was adjusted.

INVENTOR.
KURT SCHNEGG

METHOD OF DETECTING THE END-OF-CHARGE CONDITION OF AN ELECTRIC STORAGE BATTERY UNDER CHARGE AND DEVICE FOR THE CARRYING OUT OF THIS METHOD

The present invention relates to a method of detecting the end-of-charge condition of an electric storage battery which is under charge and the equivalent diagram of which comprises in series a source of voltage corresponding to the electromotive force of the storage battery, a first resistor shunted by a capacitance and corresponding to the internal resistance of chemical origin of the storage battery, and a resistance substantially free of parallel capacitance and corresponding to the inherent internal resistance of the conductive elements of the current; the invention also relates to a device for the carrying out of this method intended to control the operation of the charging circuit of an electric storage battery charger.

The proper periodic recharging of storage batteries contributes towards assuring them a long life; this proper recharging depends on two necessary conditions: on the one hand, it must be as complete as possible and, on the other hand, it must not lead to an excessive supplying of electrical energy to the storage battery, as excess energy; that is to say, the energy corresponding to a current passing through the storage battery in its recharging direction when said storage battery has already been completely recharged, has the effect of causing the storage battery to "boil" and to thus cause a liberation of gas which may damage or even completely destroy the storage battery, particularly in storage batteries of the nonspillable and seminonspillable-type.

When a storage battery is charged by means of any charger, its end-of-charge condition coincides with certain phenomena of a chemical nature which cause an increase of a resistance of chemical origin which is in series with the source of electromotive force of the storage battery. In lead storage batteries, such as storage batteries of the conventional type intended for automotive vehicles, this resistance is relatively high and an increase thereof is easily detected. This is not true of storage batteries of the nonspillable or seminonspillable type in which the drop in voltage caused by this resistance of chemical origin is of the same order of magnitude or even less than the tolerance as to the counterelectromotive force of the storage battery (manufacturing tolerances, aging tolerances, etc.) so that the detection of the end-of-charge condition of such a storage battery by direct measurement of the total voltage at the terminals of the storage battery proves very difficult, if not impossible, and in any event very risky, particularly when it is desired to effect the recharging, in succession, of a large number of storage batteries of the same type without the necessity of effecting a separate adjustment for each particular storage battery in order to adapt the device for detecting the end-of-charge to the particular counterelectromotive force characteristics of the storage battery which is being charged.

The problem of detecting the end-of-charge of a storage battery which is being charged is further complicated by the fact that a storage battery has an equivalent electrical diagram which comprises in series a source of voltage (or electromotive force), an internal resistance of chemical origin which is precisely the said resistance which varies at the end-of-charge but which is shunted by a large capacitance with which it forms an RC circuit having a substantial time constant, and a resistor which is substantially free of shunted capacitance which corresponds to the inherent resistance of the elements conducting the current in the storage battery. The variation of the voltage at the terminals of the storage battery which takes place immediately at the moment when the current which is charging said storage battery is interrupted can therefore not provide a valid indication of the state of charge of the storage battery, since this variation depends on the inherent ohmic resistance of the conductive elements (which for all practical purposes does not vary with the state of charge of the storage battery) and not with the said resistance of chemical origin (which depends on the state of charge of the storage battery.)

In order to solve the problem of the recharging of the cells of nonspillable storage batteries, it has been suggested to provide them with a third measurement electrode which serves merely to detect the end-of-charge condition when charging said cell. This solution, although seemingly excellent, has the great disadvantage of requiring a special construction of the storage battery and of not being able to be applied to storage batteries of customary type having only two electrodes.

The object of the present invention is to provide a method and a device for detecting the end-of-charge state of an electric storage battery under charge which are free of the aforementioned drawbacks.

The method of the invention is characterized by the fact that periodically the charging current is interrupted after having adjusted a threshold-comparator member in accordance with a threshold parameter which depends on the value which this current had just before it was interrupted, this interruption of current being maintained on each occasion for a period of time corresponding to at least the order of magnitude of the time constant determined by the said first resistance and the said capacitance which shunts it; during this interruption of current, the storage battery is connected to a voltage test member adapted to supply an electrical magnitude which depends on the decrease in voltage of the storage battery which has occurred during this interruption of current; the said electrical magnitude is applied to the said threshold-comparator member and the latter is caused to supply a signal which indicates the fact that the said electrical magnitude has or has not reached a value determined in said comparator member by the said threshold parameter on the basis of which it was adjusted.

The device in accordance with the invention for the carrying out of this process which is intended to control the operation of the charging circuit of an electric storage battery charger is characterized by the fact that it comprises means for periodically interrupting the charging current, a threshold-comparator member so adapted that the threshold which is defined there corresponds during each periodic interruption of the charge current to a parameter determined by the value which the charging current had just before it was interrupted, a voltage test member adapted to supply said threshold comparator member upon each periodic interruption of the current with an electrical magnitude dependent on the decrease in voltage of the storage battery which has occurred during said interruption, and means operating as a function of said threshold-comparator member and adapted finally to interrupt the charging current as soon as the said threshold comparator member, upon a said interruption of current, has supplied a signal indicating the fact that the said electrical magnitude has reached a value corresponding to the threshold defined in the said comparator member.

The accompanying drawing shows by way of example one embodiment of the method of the invention and one embodiment of the device of the invention included in a charger.

Figure 2:
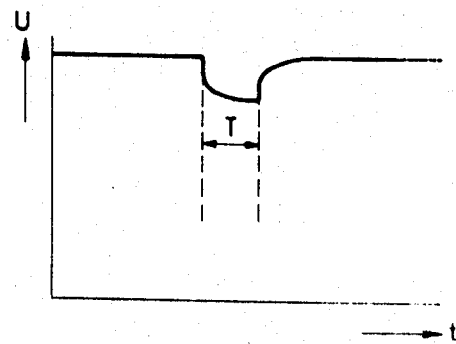
FIG. 2 is a diagram showing the voltage at the terminals of the storage battery as a function of the time when the current charging the storage battery is interrupted for a certain period of time.
Figure 3:
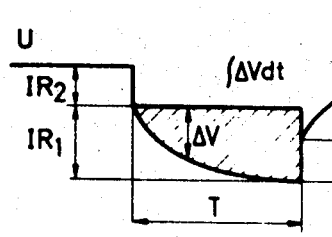
Figure 4:
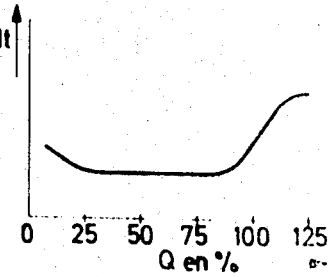
Figure 5:
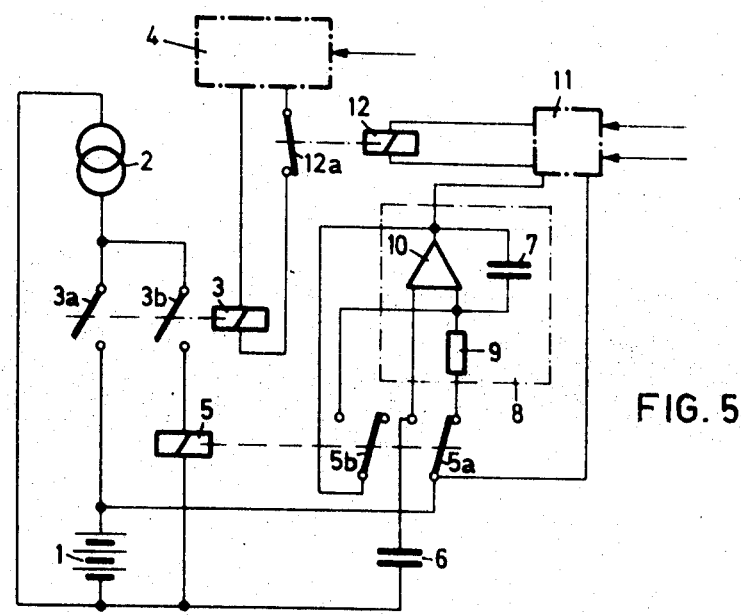
Figure 5A:
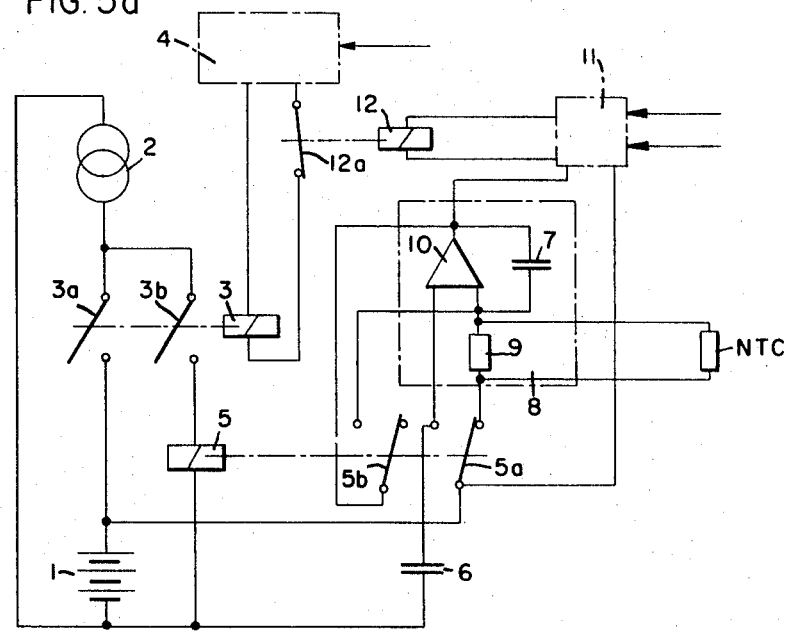
Figure 5B:
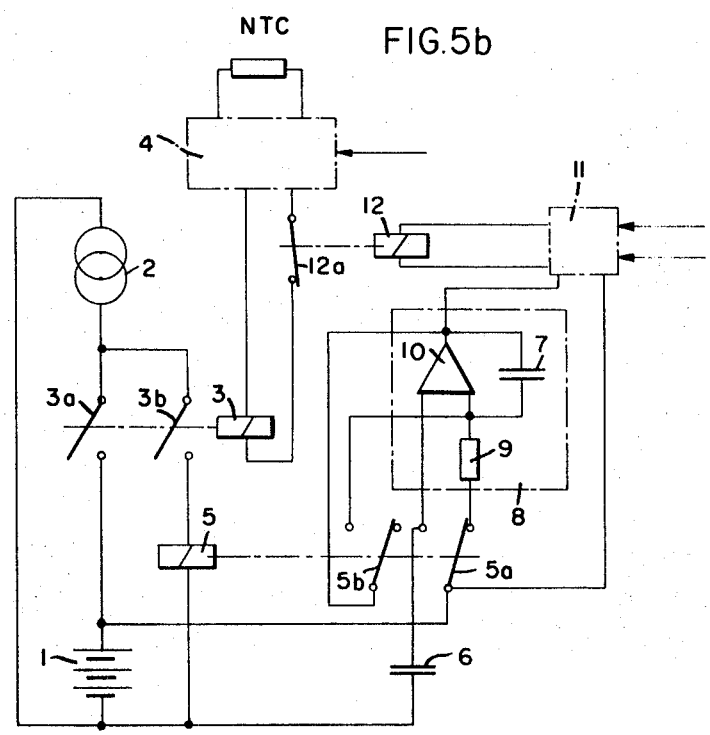

FIG. 3 is a diagram corresponding, on a larger scale, to a part of the diagram of FIG. 2 and also showing an area representing an integrated value FIG. 4 is a diagram showing the variation in the integrated value of FIG. 3 as a function of the condition of charge of the storage battery, and FIGS. 5, 5a and 5b are diagrams of a device which employs the method for controlling the charge of a storage battery by detecting the end-of-charge condition of the latter in order then to interrupt the charging process.

Figure 1:
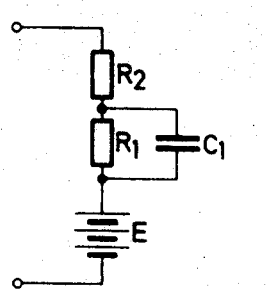
FIG. 1 is an equivalent diagram of a storage battery.

In FIG. 1 it is seen that a storage battery can be replaced schematically by a pure source of voltage $E$ (internal resistance of $E=0$) in series with a resistance $R_1$ of chemical origin which itself is shunted by a capacitance $C_1$ in series furthermore with a resistor $R_2$ which corresponds to the ohmic resistance of the elements conducting the current in the storage battery.

The resistor $R_2$ for all practical purposes does not vary with the condition of charge of the storage battery; it is determined primarily by the nature of the separators as well as by the contacts of the elements and furthermore by the nature of the electrolyte and in general by the construction of the storage battery. This resistance $R_2$ in general decreases slightly with an increase in the temperature.

The resistance $R_1$ and the capacitance $C_1$ which shunts it are determined by the nature of the chemical reaction. At the end-of-charge the resistance $R_1$ assumes a value which is a multiple of that which it has during charging. The end-of-charge of the storage battery can therefore be determined by the increase of the resistance $R_1$ provided that this variation can be detected.

FIG. 2 shows the voltage at the terminals of the storage battery as a function of the time as present when, during constant-current charging of the storage battery, the charging current of the storage battery is interrupted for a period of time $T$. It is seen that the voltage $U$ decreases instantaneously upon the interruption of the current, this instantaneous decrease corresponding to the disappearance of the ohmic voltage drop in the resistor $R_2$. Thereupon, during the interruption (period $T$), the voltage continues to decrease progressively in a manner which corresponds in the equivalent diagram to the discharge of the capacitance $C_1$ over the resistor $R_1$. The course of the voltage is then exponential; the voltage $U$ tends, with a time constant defined by $R_1C_1$, towards a value corresponding to the complete discharge of the capacitor $C_1$. After the period $T$, the charge current is again reestablished and there is a sudden increase in the voltage due to the voltage drop in $R_2$ followed by a progressive exponential increase of the voltage due to the charging of the capacitance $C_1$ up to a value corresponding to the product of the charging current by the resistance $R_1$.

The process described above consists in periodically interrupting the charging current for a period of time $T$ which is sufficiently long for the capacitance $C_1$ to discharge practically completely over the resistor $R_1$ (if the period $T$ is equal, for instance, to 3 times the product $R_1C_1$, the residual charge of the capacitance $C_1$ at the end of this period will only be about 5 percent of the initial charge of said capacitance at the start of the period $T$) and each time comparing an electrical magnitude dependent on $R_1$ and which has been established during this period of interruption $T$ with a reference (or threshold) value such that said magnitude is equal to it when $R_1$ has assumed its value which corresponds to the end-of-charge.

The manner of carrying out the process which has been described above presupposes that the charging is effected with constant current, not because this is a necessity but because this simplifies the apparatus for carrying out this process, which will be described further below.

FIG. 3 illustrates in further detail the manner in which one proceeds upon each interruption of charging current. In this figure there can be noted, on a larger scale, the change of the voltage $U$ during the interruption of current $T$. The magnitude which is to be used as criterion in order to determine whether the storage battery is already in its end-of-charge condition will be a magnitude which is dependent on the value $IR_1$. It should be pointed out that the magnitude $IR_1$ is not directly accessible and that it is never in any case measurable directly. One could, of course, measure the voltage $U$ just after the interruption, that is to say, at the moment when the drop in voltage $IR_2$ no longer affects this voltage $U$, memorize the value thus measured and then measure the voltage $U$ at the end of the period $T$ and, by electronic or other means, establish the difference between the voltage $U$ measured at the end of the period $T$ and the value initially memorized. In the particular case, it is preferred to integrate over the entire period $T$ the difference $\Delta V$ between the value which the voltage $U$ had just after the interruption of the current (which value is memorized in suitable manner) and the voltage $U$ which changes during the period $T$. Depending on whether the storage battery is in the course of charging or at the end-of-charge, the value of $R_1$ will be different. If the period $T$ is at least equal to the product $R_1C_1$ corresponding to the largest value of $R_1$ (and therefore at end-of-charge,) the integral of the value $\Delta Vdt$ will vary almost proportionally to the value $R_1$; if the period $T$ were shorter, this variation would no longer be proportional, but it would nevertheless always take place in the same direction, which, although very slightly decreasing the precision of the measurement, would nevertheless make it possible to know the value of $R_1$ via this integral.

The great advantage of the "integration" method over the "simple difference" method consists in the fact that through the expedient of the integration time $T$, one can very conveniently vary the factor of correspondence which exists between the predetermined value of $R_1$ which it is desired to detect and the threshold value conditioning the member which is to detect the fact that the effective value of $R_1$ has reached this predetermined value. As it is necessary in order to maintain the precision of detection to adapt the said predetermined value of $R_1$ as a function of the temperature (and since, in the event that one was not operating with constant current, it would be necessary also to take into account the factor I,) it is very useful to have a parameter which makes it possible to vary the said factor of correspondence, which is equivalent to varying the threshold of the member which is to finally effect the detection of the end of the charging.

FIG. 4 shows, as a function of the degree of charge $Q$ of the storage battery, the relative value which the integral of $\Delta Vdt$ assumes for a constant time of interruption of current $T$. It is seen that up to about 90 percent charge, the value of this integral remains practically constant and that it then increases very rapidly, having doubled when the degree of charge reaches 100 percent, and tripling or even quadrupling as soon as one slightly exceeds 100 percent. It will also be noted that for degrees of charge of less than 25 percent, the integral of $\Delta Vdt$ assumes a value very slightly higher than that which it has between 20 and 90 percent degree-of-charge. This, however, is not disturbing, since the first test by interruption of current which is effected after having started the charging of a storage battery takes place only when this storage battery has been supplied with at least about 10 percent of its charge; at this moment the value of the integral is already less than the value which it assumes at 100 percent charge; therefore, due to this slight increase of the integral for very low degrees of charge, there is no danger of a storage battery being considered charged while it is discharged. Should it happen that inadvertently a storage battery which is already 100 percent charged is placed under charge, it would receive, before the first test reveals its end-of-charge state, an overcharge of about 10 percent; since at this time the storage battery would not be heated up by a charging process and since the damage to the storage battery in case of overcharge is due primarily to thermal causes and in any event does not take place below 110 to 130 percent charge, this slight overcharge would in no event damage this storage battery.

By regulating the charging current to a value such that a storage battery is charged in two to three hours by interrupting the charging current approximately every 5 minutes for a period of time $T$ of about 1 minute (this time $T$ remaining always the same, aside from the fact that one can intentionally cause it to vary slightly in order to take into account effects of the increase in temperature) and by detecting upon each interruption, by electronic means, the integral of $\Delta Vdt$, which integral is fed into a threshold comparator circuit so arranged that the value of the integral reaches the value of its threshold when it corresponds to a charge of about 100 percent, one assures a charge of the storage battery which is always adequate and uniform.

If one worked with a variable, nonconstant current, adaptation to the current would be necessary, and one could, for instance, by means of an electronic circuit which can easily be devised, make the period $T$ all the longer as the current decreases in such a way that the integral always reaches the threshold value of the comparator circuit for the predetermined value of $R_1$ corresponding to 100 percent charge.

One may also have to take into consideration variations of $R_1$ as a function of the temperature; for this it is possible to vary the period $T$ as a function of the temperature by introducing, for instance, an NTC-resistor in the time-delay circuit by means of which the period $T$ is determined. One could also allow this period $T$ to remain at all times the same and vary the integration constant of the integrating device used for the obtaining of the integrated value $$\int \Delta V dt$$

Let us now examine the arrangement shown in FIG. 5 by means of which the process described above is placed into action. In this figure there is shown a storage battery cell 1 which is charged with constant current, being connected to a DC generator 2 which could, for instance, be a constant-current battery charger of conventional type. The contact 3a of a relay 3 makes or breaks the charging current in the storage battery 1. This relay 3 is controlled by a programming circuit 4 which causes the relay 3 to attract during the greatest part of the charging process and cause it to release periodically (for instance every 5 minutes) for a period of time equal to the period $T$ (this period of interruption being determined as a function of what we have previously seen; it will, for instance be a minute.) A relay 5 is fed in parallel with the storage battery via a second contact 3b of the same relay 3 so that the said relay 5 is attracted whenever a charging current passes in the storage battery and releases each time that no charging current passes therein. When this relay 5 is attracted, a switch contact 5a which it actuates establishes a direct connection between a capacitor 6 and the storage battery 1 so that the voltage at the terminals of the capacitor 6 is precisely the same as the voltage at the terminals of the storage battery 1. When the relay 5 drops out again, this voltage-identification connection is interrupted and the capacitor 6 retains the voltage which it had just before the contact 5a passes from its working position to its rest position (the rest position has been shown in the figure.) However, due to the delay in the dropping out of the relay 5 (which delay need not be especially determined since the delay inherent in any relay is sufficient in the present case,) the capacitor 6 is still connected in parallel with the storage battery 1 for a very brief moment as a result of the interruption of the charge current in said storage battery. As a result, the voltage which is stored in the capacitor 6 corresponds to the voltage at the terminals of the storage battery at the moment when the current no longer passes therein, that is to say, when the drop in voltage in the resistor $R_2$ no longer takes place.

It is seen furthermore from FIG. 5 that a contact 5b of the relay 5 short-circuits the integration capacitor 7 of an integrator circuit 8 when the relay 5 is attracted; as soon as the relay 5 drops out again, the connection which short-circuited this capacitor 7 is interrupted. It is also seen that the switch contact 5a which, when the relay 5 was attracted, conducted the voltage of the storage battery 1 to the capacitor 6, which this relay 5 has dropped out, conducts the voltage of the storage battery 1 via a resistor 9 to an input of a differential operational amplifier 10 which also forms part of the integrator circuit 8. The capacitor 6 is itself connected permanently to a second input of this operational amplifier 10 so that as soon as the relay 5 has relaxed, one of the inputs of this operational amplifier 10 is fed by the voltage of the storage battery, while the other is fed by the voltage stored in the capacitor 6. Since, from this moment the integrating capacitor 7 which loops the output of the operational amplifier 10 to that of its inputs in which the resistor 9 is also connected ceases to be short-circuited, one obtains at the output of this differential operational amplifier 10, which output also constitutes the output of the integrator circuit 8, a voltage which is proportional to the integral of the difference of the voltages connected to the two inputs of the operational amplifier 10; this is obtained due to the special manner of operation of a differential operational amplifier looped by a capacitor, which operation is well known so that it is not necessary to dwell at length on it here. The output voltage of the integrator circuit 8 is brought to a threshold trigger 11 to which there is also fed, as reference voltage, the voltage of the storage battery 1, with the result that between the two inputs of said threshold trigger 11 there is present during the entire time $T$ a difference in voltage equal to the voltage on the integrator capacitor 7. The trigger 11 is a bistable trigger of the threshold-type which is in a state of rest as long as the voltage of its inputs has not reached a certain given threshold value and which suddenly passes into an operating state when the voltage of its inputs has reached said given threshold value. If during the period $T$ of interruption of the charging current the voltage representative of the integral of $\Delta V dt$ does not succeed in reaching the threshold which conditions the trigger 11, said trigger remains in its state of rest. When, as happens when the storage battery is completely charged, the value representing said integral reaches the threshold which conditions the trigger 11, the latter passes into its operating state and then supplies a feed voltage to a relay 12 a rest contact 12a of which is in series in the circuit feeding the relay 3. As soon as the threshold trigger 11 has passed into its working state, the relay 12 attracts and the contact 12a finally interrupts the circuit which feeds the relay 3. The latter can therefore no longer attract and the charging current is not released into the storage battery 1, the relay 5 not being reenergized either. As a result, the integration process continues until saturation of the differential operational amplifier 10 and the threshold trigger 11 remains permanently in working condition, while holding the relay 12 in attracted position. The charging process therefore is finally stopped; an auxiliary contact with which the relay 12 may be provided but which is not shown in FIG. 5 could at this moment give off an optical or acoustic alarm indicating that the storage battery has arrived at the end-of-charge.

When the storage battery 1 is charged, it can be disconnected and replaced by another storage battery to be charged; in order to replace the device in operation, it is sufficient, for instance by means of an auxiliary contact not shown in FIG. 5, to cause the threshold trigger 11 to pass again into its state of rest, which will result in the dropping out of the relay 12 and the attraction in succession of the relays 3 and 5 as a function of the rate of the programming circuit 4.

It has been seen above that it was at times necessary, due to variations in temperature, to vary the predetermined value which the resistance $R_1$ is to reach in order for the charging to be considered completed. One could, of course, effect these variations as a function of the temperature by conditioning the threshold of the trigger 11 by means of a temperature-sensitive element, for instance an NTC-resistance. It is easier to maintain this threshold constant (possibly adjustable within the range of the adjustment of the device) and to vary the factor of correspondence between the voltage which must be applied to this trigger 11 in order for the latter to pass from its position of rest into its working position and the value of the resistance $R_1$ for which this voltage will be applied to the trigger 11. This can be done in two ways: first of all, by varying the integration factor, that is to say, the RC constant of the integrator circuit 8, and, secondly, by varying the integration time, that is to say, the period $T$ during which the charging current of the storage battery 1 is interrupted. In the first case it will be necessary to act by means of a temperature-sensitive element on the integrator circuit 8, e.g., by means of an NTC-resistor placed close to the storage battery and connected in parallel with resistor 9, as shown in FIG. 5a, while in the second case it will be necessary to act on the programming circuit 4 in order to adapt the duration of the periods of interruption of the charging current to the temperature which will be measured, for instance, by means of an NTC-resistor close to the storage battery and connected in a voltage-sensor circuit, as is shown in FIG. 5b.

One therefore has in actual fact three adjustable factors, namely the triggering threshold of the trigger 11, the integration constant or RC constant of the integrator circuit 8 and the integration time determined by the programming circuit 4. If it happens that instead of charging at constant current one is charging at variable current, it will be necessary to have one of these factors correspond with the charging current which flowed in the storage battery just before the interruption of time $T$. In this case, one can, for instance, condition the threshold of the trigger 11 as a function of this current (a memorizer device, for instance, of capacitor-type connecting the charging circuit of the storage battery to the trigger 11 will easily effect this adaptation) and use one or the other or both these other factors to effect the temperature compensations.

The arrangement described can, of course—as shown, for instance, in FIG. 5—be directly included in the battery charging apparatus; it could also be constructed by itself and be added to an existing charger, being then connected between the output of the charging current of the charger and the storage battery. One could, for instance, provide a charger (acting the role of 2) of high capacity which would simultaneously charge a large number of storage batteries by as many devices similar to the one described (with the exception of 2) as there are storage batteries to be charged.

It would also be possible—and this would be particularly suitable in the event that the device is included in a charger—to provide various switching possibilities corresponding to different types of storage battery cells and different numbers of cells connected in series in a storage battery, which switchings could also affect the size of the charging current as a function of the capacity of the storage battery cells to be charged.

What is claimed is:

1. A method of detecting the end-of-charge condition of an electric storage battery having a chemically originated internal resistance and being charged, comprising
    conditioning a threshold-comparator member in accordance with a threshold parameter depending on the value which a battery charging current had prior to interruption of said charging current;
    periodically interrupting said charging current;
    maintaining each of said interruptions for a period corresponding to at least the order of magnitude of a time constant determined by a parallel resistance-capacitance combination corresponding to said internal resistance of chemical origin of said storage battery;
    connecting said storage battery to a voltage-test member adapted to supply an electric magnitude depending on a decrease in voltage of said storage battery, said decrease taking place during each period of interruption, said voltage test member being arranged and operated in such a manner as to cause it to record the value of the voltage of said storage battery just after the start of said interruption of current, whereupon it is caused to read the value of the voltage of said storage battery immediately prior to the end of said interruption, and then cause it to supply said electric magnitude in correspondence with the difference of these two voltage values;
    applying said electric magnitude to said threshold-comparator member;
    causing a signal to be supplied by said threshold-comparator member to indicate whether said electric magnitude has reached a value determined in said comparator member by said threshold parameter with which it was conditioned.

2. A method of detecting the end-of-charge condition of an electric storage battery having a chemically originated internal resistance and being charged at constant current, comprising
    conditioning a threshold-comparator member in accordance with a threshold parameter depending on the value which a battery charging current had prior to interruption of said charging current, said parameter remaining constant for the entire duration of a complete charge and corresponding to said constant current;
    periodically interrupting said charging current;
    maintaining each of said interruptions for a period corresponding to at least the order of magnitude of a time constant determined by a parallel resistance-capacitance combination corresponding to said internal resistance of chemical origin of said storage battery;
    connecting said storage battery to a voltage test member adapted to supply an electric magnitude depending on a decrease in voltage of said storage battery, said decrease taking place during each period of interruption, said voltage test member being arranged and operated in such a manner as to cause it to record the value of the voltage of said storage battery just after the start of said interruption of current, whereupon it is caused to read the value of the voltage of said storage battery immediately prior to the end of said interruption, and then cause it to supply said electric magnitude in correspondence with the difference of these two voltage values; and then cause it to supply said electric magnitude in correspondence with the difference of these two voltage values;
    applying said electric magnitude to said threshold-comparator member;
    causing a signal to be supplied by said threshold-comparator member to indicate whether said electric magnitude has reached a value determined in said comparator member by said threshold parameter with which it was conditioned.

3. A method of detecting the end-of-charge condition of an electric storage battery having a chemically originated internal resistance and being charged, comprising
    conditioning a threshold-comparator member in accordance with a threshold parameter depending on the value which a battery charging current had prior to interruption of said charging current;
    periodically interrupting said charging current;
    maintaining each of said interruptions for a period corresponding to at least the order of magnitude of a time constant determined by a parallel resistance-capacitance combination corresponding to said internal resistance of chemical origin of said storage battery;
    connecting said storage battery to a voltage-test member adapted to supply an electric magnitude depending on a decrease in voltage of said storage battery, said decrease taking place during each period of interruption, said voltage test member being arranged and caused to operate in such a manner as to cause it to record the value of the voltage of said storage battery just after the start of said interruption of current, cause it to read the value of the voltage of said storage battery permanently during one entire period of interruption of said charging current and to integrate, as a function of time, the difference between these two voltage values during said entire period, each of said periods of interruption being of equal duration, at least in case of operation at a constant temperature, and cause it to supply the said electric magnitude in correspondence with the integral of the instantaneous values of said difference;
    applying said electric magnitude to said threshold-comparator member;
    causing a signal to be supplied by said threshold-comparator member to indicate whether said electric magnitude has reached a value determined in said comparator member by said threshold parameter with which it was conditioned.

4. The method according to claim 3 wherein the changes of said internal resistance of chemical origin of said storage battery are compensated by varying an integration factor of said voltage-test member as a function of temperature.

5. The method according to claim 3 wherein the changes of said internal resistance of chemical origin of said storage battery are compensated by changing, as a function of the temperature, the duration of said period of interruption of current during which the integration of the difference between said two voltage values is effected.

6. A method of detecting the end-of-charge condition of an electric storage battery having a chemically originated internal resistance and being charged at constant current, comprising conditioning a threshold-comparator member in accordance with a threshold parameter depending on the value which a battery-charging current had prior to interruption of said charging current, said parameter remaining constant for the entire duration of a complete charge and corresponding to said constant current;

periodically interrupting said charging current;

maintaining each of said interruptions for a period corresponding to at least the order of magnitude of a time constant determined by a parallel resistance-capacitance combination corresponding to said internal resistance of chemical origin of said storage battery;

connecting said storage battery to a voltage-test member adapted to supply an electric magnitude depending on a decrease in voltage of said storage battery, said decrease taking place during each period of interruption, said voltage-test member being arranged and caused to operate in such a manner as to cause it to record the value of the voltage of said storage battery just after the start of said interruption of current, cause it to read the value of the voltage of said storage battery permanently during one entire period of interruption of said charging current and to integrate, as a function of time, the difference between these two voltage values during said entire period, each of said periods of interruption being of equal duration, at least in case of operation at a constant temperature, and cause it to supply the said electric magnitude in correspondence with the integral of the instantaneous values of said difference;

applying said electric magnitude to said threshold-comparator member;

causing a signal to be supplied by said threshold-comparator member to indicate whether said electric magnitude has reached a value determined in said comparator member by said threshold parameter with which it was conditioned.

7. A device for detecting the end-of-charge condition of an electric storage battery being charged at constant current, comprising means for periodically interrupting a current charging said battery, a threshold-comparator member adapted to define a threshold corresponding during each period of interruption to a parameter determined by the value which said charging current had immediately prior to its interruption; a voltage-test member adapted to supply to said threshold-comparator member upon each periodic interruption an electric magnitude dependent upon a decrease in voltage in said battery during said interruption; and means operating as a function of said threshold-comparator member and adapted to interrupt said charging current when said comparator member has supplied a signal indicating that said electric magnitude has reached a value corresponding to a threshold defined in said comparator member, said voltage-test member comprising a two-input differential integrator circuit and a voltage-memorization capacitor connected to one input and adapted so that its voltage becomes substantially identical to that of said storage battery at the start of each period of interruption of the charging current and then remains substantially constant at the value thus acquired without following the change of voltage of the storage battery during the balance of said period; a second input of said differential integrator circuit being connected to present for said period of interruption a voltage identical to that of said storage battery, an output of said differential integrator circuit being connected to apply an output signal which it bears to said threshold-comparator member, said comparator member being adapted to process said output signal as constituting said electric magnitude.

8. A device according to claim 7 wherein said differential integrator circuit has an integration factor which varies as a function of temperature in accordance with the corresponding changes of parameters of said storage battery.

9. A device according to claim 7 wherein said means for periodically interrupting said charging current comprise a programming circuit for determining duration and periodicity of said current interruptions, said programming circuit being adapted to vary the duration of said periods of interruption as a function of temperature in accordance with the corresponding changes of parameters of said storage battery.

10. A device according to claim 7 wherein said threshold-comparator member comprises an adjustable threshold trigger adapted to trigger when said electric magnitude reaches said threshold and to control actuation of a final interruption means of said charging current when said trigger is in a condition resulting from said triggering, said threshold of said trigger is adjustable electronically, and wherein said device comprises automatic means for regulating said threshold as a function of a last value of charging current which has passed therethrough.

11. A device according to claim 7 wherein said threshold-comparator member comprises an adjustable threshold trigger adapted to trigger when said electric magnitude reaches said threshold and to control actuation of a final interruption means of said charging current when said trigger is in a condition resulting from said triggering, said threshold of the said trigger being adjustable manually by means permitting adjustment for the duration of a complete charge of said threshold in correspondence with a constant-charge current.

12. A device for detecting the end-of-charge condition of an electric storage battery being charged, comprising means for periodically interrupting a current charging said battery, a threshold-comparator member adapted to define a threshold which remains constant during the duration of a complete charge and corresponds to a parameter determined by the value of said constant-charging current; a voltage-test member adapted to supply to said threshold-comparator member upon each periodic interruption an electric magnitude dependent upon a decrease in voltage in said battery during said interruption; and means operating as a function of said threshold-comparator member and adapted to interrupt said charging current when said comparator member has supplied a signal indicating that said electric magnitude has reached a value corresponding to a threshold defined in said comparator member, said voltage-test member comprising a two-input differential integrator circuit and a voltage memorization capacitor connected to one input and adapted so that its voltage becomes substantially identical to that of said storage battery at the start of each period of interruption of the charging current and then remains substantially constant at the value thus acquired without following the change of voltage of the storage battery during the balance of said period; a second input of said differential integrator circuit being connected to present for said period of interruption a voltage identical to that of said storage battery, an output of said differential integrator circuit being connected to apply an output signal which it bears to said threshold-comparator member, said comparator member being adapted to process said output signal as constituting said electric magnitude.

* * * * *